Patented June 15, 1937

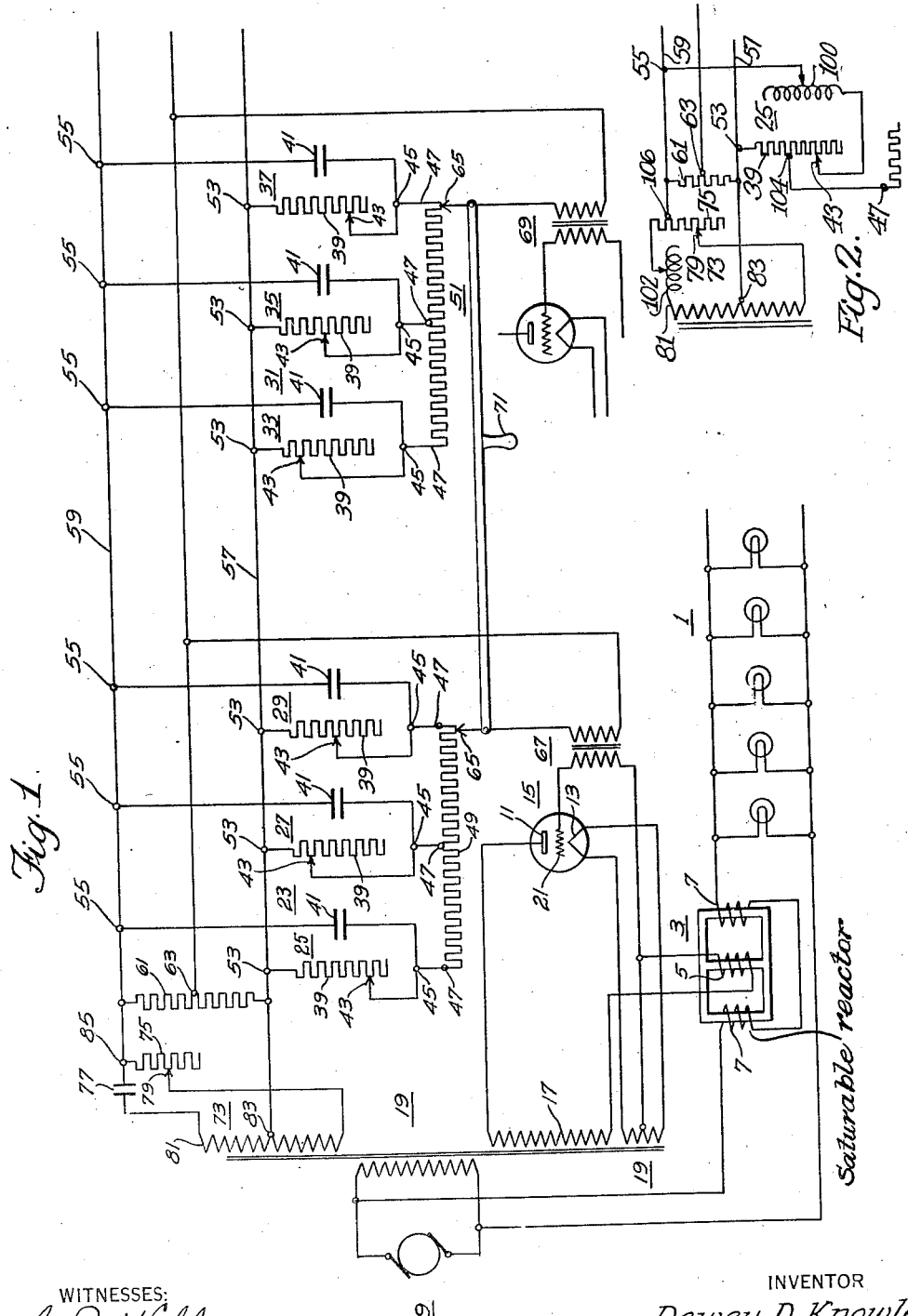

2,084,036

UNITED STATES PATENT OFFICE 2,084,036

CONTROL APPARATUS

Dewey D. Knowles, Forest Hills, Pa., assignor to Westinghouse Electric & Manufacturing Company, East Pittsburgh, Pa., a corporation of Pennsylvania Application December 14, 1934, Serial No. 757,558

10 Claims. (Cl. 172—246)

My invention relates to control apparatus and has particular relation to apparatus for controlling and varying the excitation of a plurality of translating devices.

It is an object of my invention to provide apparatus for controlling and varying the excitation of a plurality of translating devices either individually or in groups.

Another object of my invention is to provide apparatus that shall incorporate a minimum of moving parts for controlling the excitation of a plurality of translating devices either individually or in groups.

A further object of my invention is to provide apparatus for controlling and continuously varying the condition of a plurality of translating devices that are required normally to be in different conditions of excitation.

A more specific object of my invention is to provide a system of the type that shall incorporate a minimum of moving elements for controlling the stage and auditorium lights of a theatre.

Another specific object of my invention is to provide a simple system, for controlling the illumination in a theatre, which shall incorporate, inter alia, facilities for presetting the illumination of different scenes, for fading from one scene to another and for fading from a condition in which a scene is illuminated to a condition in which it is entirely blacked out.

More concisely stated, it is an object of my invention to provide apparatus for maintaining a plurality of translating devices each in a predetermined condition of excitation, for presetting the conditions of excitation, and for progressing continuously from one condition to another and from a condition in which the translating devices are excited to a condition in which they are unexcited.

According to my invention, I provide apparatus incorporating a plurality of electric discharge devices, the excitation of which is to be varied to vary the excitation of the translating elements. Each of the electric discharge devices is maintained in a predetermined fixed condition of excitation by maintaining a predetermined phase relationship between the potentials impressed on the electrodes of the discharge device. This object is accomplished by providing a plurality of independent sets of phase determining elements. One set of elements is associated with each electric discharge device. The elements are supplied preferably but not necessarily in parallel from a periodic source of potential. For fading, the waves of the potential source are shifted in phase, and, in this manner, the phase relationship of the output of the phase determining elements is varied to vary the excitation of the individual discharge devices.

The novel features that I consider characteristic of my invention are set forth with particularity in the appended claims. The invention itself, however, both as to its organization and its method of operation, together with additional objects and advantages thereof will best be understood from the following description of a specific embodiment when read in connection with the accompanying drawing, in which:

Figure 1 is a diagrammatic view showing an embodiment of my invention; and

Fig. 2 is a diagrammatic view showing the essential features of a modification of my invention.

The apparatus shown in the drawing includes a system of illuminating units 1 which may be located in a theatre or any other public institution. The illuminating units are subdivided into groups corresponding to the different portions of the region that is to be illuminated. Thus, in a theatre, certain portions of the stage may require different sets of illuminating units. The same is true of the auditorium. In accordance with the practice of my invention, each of the sets of illuminating units 1 has associated therewith a control unit, as shall be hereinafter described. In the drawing only a single set 1 of illuminating units is actually illustrated, but the relationship of the other sets of illuminating units to corresponding control units is apparent.

Each control unit comprises a saturable reactor 3 provided with input and output windings 5 and 7. The output windings 7 are connected in series with the illuminating units 1 and with the power source 9 from which the system is energized. The input winding 5 is connected in series with the anode 11 and the cathode 13 of an electric discharge device 15, which is preferably of the hot cathode gas-filled type, and a secondary section 17 of the power supply transformer 19. When the discharge device 15 is energized, the input winding 5 of the reactor 3 is supplied with current and its saturation being increased to a degree depending on the magnitude of the current supplied, the reactance 7 in series with the illuminating units 1 is correspondingly decreased. As the output current of the electric discharge device 15 is varied, the reactance 7 in series with the illuminating units 1 is varied and the output illumination of the units is varied.

The discharge device 15 is provided with a control electrode 21 in addition to the other electrodes 11 and 13 and the current output thereof is varied by varying the phase relationship between the principal potential (i. e. the potential impressed between the principal electrodes 11 and 13) and the control potential (i. e. the potential impressed between the control electrode 21 and the cathode 13) applied thereto. Each control unit is provided with an electrical discharge device 15 and a reactor 3 of the type discussed hereinabove and with facilities for setting and shifting the phase relationship between the principal and control potentials applied to the electric discharge device, and each set of illuminating units is controlled from an electric discharge device and a reactor in the same manner as the set 1 actually illustrated.

To adjust the phase relationship of the potentials impressed on the discharge device 15, a set 23 of phase-determining elements 25, 27 and 29 is provided. A similar set 31 (say) incorporating the elements 33, 35 and 37 is provided for each of the other discharge devices (not shown). Each phase-determining element comprises a network including a resistor 39 and capacitor 41 connected in series with each other. Each resistor is provided with a movable tap 43 and the junction point 45 of the movable tap 43 and the capacitor 41 of each phase determining element is connected to a point 47 on potentiometers 49 and 51, one potentiometer being provided for each set of elements. The points 47 along the potentiometers 49 and 51 to which the junction points 45 are connected may be properly spaced to yield the effect desired.

The corresponding terminals 53 and 55, respectively, of the networks 25, 27, 29, 33, 35 and 37 in all of the sets 23 and 31 are connected to common conductors 57 and 59 and between the conductors 57 and 59 a resistor 61 is connected. The resistor 61 is provided with an intermediate tap 63 and the difference of potential which exists between the intermediate tap 63 of the resistor 61 and the movable tap 65 of the potentiometers 49 and 51 when potential is impressed in the system, is coupled between the control electrode 21 and the cathode 13 of the discharge device 15 corresponding to any set 23 or 31 of phase-determining elements through suitable transformers 67 and 69.

The individual phase-determining elements 25, 27 and 29 or 33, 35 and 37 of any set 23 or 31 correspond to different scenes that are to be produced. Thus elements 25 and 33 correspond to one scene, 27 and 35 to another and 29 and 37 to a third. The elements are pre-adjusted to positions corresponding to the illumination desired for the individual scenes. During the performance of any scene, the movable taps 65 of the potentiometers 49 and 51 are set at points such that their potential is equivalent to the potential of the junction point 45 of the phase determining elements corresponding to the scene. In the drawing the potentiometers 49 and 51 are set for the production of the scene corresponding to the elements 29 and 37. In this position the potential impressed on the discharge devices corresponds to the potential existing between the intermediate tap 63 and the junction points 45 of the networks 29 and 37.

When the next scene is to be produced, the movable taps 65 are displaced from the last position to a position in which their potential is equivalent to the potential of the junction point of the phase-determining elements corresponding to the next scene. The illumination of each portion of the region under control is pre-adjusted in the same manner and the fading from one scene to the subsequent scene is carried out by simultaneously shifting the movable taps of the potentiometer. In the preferred practice of my invention, the movable taps 65 are provided with a common displacement handle 71, as is illustrated in the drawing.

The conductors 57 and 59 to which the terminals of the phase determining elements are connected are supplied with potential through a master phase-determining element 73. The latter element comprises a variable resistor 75 and a capacitor 77 connected in series. The movable tap 79 of the variable resistor 75 and the outer plate of the capacitor 77 are connected to the terminal taps of a secondary section 81 of the power supply transformer 19. The secondary section 81 is also provided with an intermediate tap 83. The conductors 59 and 57 are connected, respectively, to the junction point 85 of the capacitor 77 and the fixed terminal of the resistor 75 and to the intermediate tap 83 of the secondary section 81.

When, during any scene, the illumination is to be varied, the movable tap 79 of the resistor 75 is varied and any desired fading of the illumination takes place, it is to be noted that by varying the resistor of the single phase-determining element 73 all of the control units are varied and all of the illumination in the region under control is varied. While the master element 73 in the system shown in the drawing controls all of the units, it is apparent that intermediate master elements may be provided to control certain intermediate groups of units. Thus an intermediate master controller may be provided for the purpose of controlling the auditorium illumination, another may be provided for the purpose of controlling the footlights, a third to control the floodlights, etc. In each case the individual phase determining elements are supplied in parallel through the particular intermediate master element in question.

My invention has been described above as applied to a system of illuminating units. It is, of course, applicable in the same manner to translating apparatus of any general type. For example, if the problem were to maintain a plurality of motors or generators each in a certain condition of excitation, to fade from one condition to another for any motor or generator and to simultaneously vary the condition of all of the motors or generators, it could be solved with facility by applying my invention.

Moreover, while I have described hereinabove specific phase determining elements, elements of other types might be utilized. Thus, the capacitors 41 and 77 in each of the elements might be replaced by inductors 100 and 102 as shown in Fig. 2. The inductors 100 and 102 might be variable in lieu of the resistors or both the resistors and the reactors might be variable. In lieu of being connected to the junction points of the reactors and resistors, the output terminals of the phase determining elements might be connected at a point 104 or 106 along the resistor or a similar point along the reactor.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. Apparatus for controlling a plurality of translating devices comprising a source of periodic potential having an intermediate tap and a plurality of terminal taps, a network including a pair of impedances for producing dephased potentials connected to said terminal taps, a plurality of additional networks each including a pair of impedances for producing dephased potentials, means for connecting one terminal of each of said last-named networks to the intermediate tap of said source, means for connecting the other terminal of each of said last-named networks to the junction point of the inpedances of said first-named network and means for supplying each of said translating devices with the difference of potential existing between a terminal intermediate the junction point of said first-named impedances and said intermediate tap and a terminal at the junction point of the impedances of one of said last-named networks.

2. Apparatus for controlling a plurality of translating devices comprising a source of periodic potential having an intermediate tap and a plurality of terminal taps, a network including a pair of impedances for producing dephased potentials connected to said terminal taps, at least one of said impedances being variable, output conductors connected to said intermediate tap and to the junction point of said impedances, a plurality of elements comprising input and output terminals, said elements being of such character that when a potential is impressed on said input terminals, a potential is produced at said output terminals which is displaced in phase relative to the potential impressed on said input terminals, means for coupling the input terminals of each of said elements to said output conductors and means for coupling said output terminals of each of said elements to one of said translating devices.

3. Apparatus for controlling a plurality of translating devices comprising a source of periodic potential having an intermediate tap and a plurality of terminal taps, a network including a pair of impedances for producing dephased potentials connected to said terminal taps, at least one of said impedances being variable, output conductors connected to said inntermediate tap and to the junction point of said impedances, a plurality of sets of elements, each element comprising input and output terminals, said elements being of such character that when a potential is impressed on said input terminals, a potential is produced at said output terminals which is displaced in phase relative to the potential impressed on said input terminals, means for coupling the input terminals of each of said elements to said output conductors and means for coupling said output terminals of all of the elements of each of said sets to one of said translating devices.

4. Apparatus for controlling a plurality of translating devices comprising a source of periodic potential having an intermediate tap and a plurality of terminal taps, a network including a pair of impedances for producing dephased potentials connected to said terminal taps, at least one of said impedances being variable, output conductors connected to said intermediate tap and to the junction point of said impedances, a plurality of sets of elements, each element comprising input and output terminals, said elements being of such characer that when a potential is impressed on said input terminals, a potential is produced at said output terminals which is displaced in phase relative to the potential impressed on said input terminals, means for coupling the input terminals of each of said elements to said output conductors and means for coupling said output terminals of all of the elements of each of said sets to one of said translating devices, the last said means including means for rendering an element of each set effective to influence the translating device coupled to said set to the substantial exclusion of said other elements of said set and means for continuously progressing from the condition in which the last said element is exclusively effective to a condition in which another element of said set is exclusively effective.

5. Apparatus according to claim 4, characterized by that the means provided for progressing from a condition in which one element of a set is effective to a condition in which another element is effective simultaneously influences a plurality of sets in the same manner as one set.

6. In combination, a plurality of translating devices, a plurality of elements having input and output terminals, each of said elements being of such character that when a periodic potential is impressed on the input terminals thereof, a potential is produced at said output terminals which is displaced in phase relative to said impressed potential, means for coupling the output terminals of each of said elements to one of said translating devices, a source of periodic potential having a plurality of terminal taps and an intermediate tap, a network including a pair of impedances for producing dephased potentials, connected to said terminal taps and means for coupling the potential produced between said intermediate tap and the junction point of said impedances to the input terminals of said elements.

7. Apparatus according to claim 6 characterized by that each of the elements comprises a network including a pair of impedances for producing dephased potentials, the input terminals being the terminals of the network and the output terminal being a point which is at a potential intermediate the potentials of the input terminals and the junction point of the impedances.

8. Apparatus for controlling a plurality of translating devices comprising a means individual to each said device for impressing a periodic potential thereon, a source of periodic voltage common to all said means, means for adjusting, at will and independently of the other said potentials, the phase of each said potential relative to the phase of said source, a second source of periodic voltage for supplying energy to the first-mentioned source and means for shifting at will the phase of the voltage of the first-mentioned source relative to that of said second source.

9. Apparatus for controlling a plurality of translating devices comprising a means individual to each said device for impressing a periodic potential thereon, a source of periodic voltage common to all said means, means for adjusting at will the phases of said potentials relative to each other, the phase of one said potential being independent of the phase of the other said potentials, a second source of periodic voltage for supplying energy to the first mentioned source, and means for varying at will the phase-relation between the respective voltages of said sources.

10. Apparatus for controlling a plurality of translating devices comprising means for impressing a first periodic potential on each said device, a means individual to each said device for impressing a second periodic potential thereon, a source of periodic voltage common to all the means last mentioned, means for adjusting at will and independently of the others of said second periodic potentials, the phase of each said second periodic potential relative to the phase of said source, a second source of periodic voltage for supplying energy to the first mentioned source and to the means first mentioned, and means for shifting at will the phase of the first-mentioned source relative to that of said second source.

DEWEY D. KNOWLES.